United States Patent
Lindholm et al.

(10) Patent No.: US 9,882,943 B2
(45) Date of Patent: Jan. 30, 2018

(54) METHOD OF ACCESS PROVISION

(71) Applicant: TELEFONAKTIEBOLAGET LM ERICSSON (PUBL), Stockholm (SE)

(72) Inventors: Fredrik Lindholm, Tokyo (JP); Bo Åström, Stockholm (SE); Alf Heidermark, Saltsjöbaden (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/148,411

(22) Filed: May 6, 2016

(65) Prior Publication Data

US 2016/0255124 A1  Sep. 1, 2016

Related U.S. Application Data

(63) Continuation of application No. 12/810,878, filed as application No. PCT/EP2007/064633 on Dec. 28, 2007, now abandoned.

(51) Int. Cl.
| | | |
|---|---|---|
| *H04L 29/06* | (2006.01) | |
| *H04W 8/06* | (2009.01) | |
| *H04W 88/02* | (2009.01) | |

(52) U.S. Cl.
CPC ...... *H04L 65/1073* (2013.01); *H04L 65/1016* (2013.01); *H04W 8/06* (2013.01); *H04W 88/02* (2013.01)

(58) Field of Classification Search
None
See application file for complete search history.

(56) References Cited

U.S. PATENT DOCUMENTS

| 7,110,393 B1 | 4/2006 | Tripathi et al. |
| 2001/0003093 A1* | 6/2001 | Lundin ........... H04W 8/10 |
| | | 455/456.5 |

(Continued)

FOREIGN PATENT DOCUMENTS

| WO | WO-2006/050758 | 3/2005 | |
| WO | WO-2006050758 | * 5/2006 | ............ H04L 29/06 |

OTHER PUBLICATIONS

"Universal Mobile Telecommunications System (UMTS); 3GPP system to Wireless Local Area Network (WLAN) interworking: System description (3GPP TS 23.234 version 7.5.0 Release 7); ETSI TS 123.234" ETSI STANDARDS, Sophia Antipolis Cedex, France. vol. 3-Sa2, No. v7.5.0, Mar. 1, 2007.

(Continued)

*Primary Examiner* — Andrew Oh (57) ABSTRACT

A method is proposed for providing a mobile terminal associated with a user with access to a visited Internet Protocol based mobile communication network. The mobile terminal generates a network information element that comprises a home network identifying element that identifies a home network of the user, and a domain name of the visited IP based mobile communication network as a base domain identifier. The mobile terminal then provides this special network information element to visited IP based mobile communication network, which executes a subscription generating procedure for generating a subscription for the user upon recognizing the special network information element and provides the mobile terminal access based on the generated subscription.

20 Claims, 10 Drawing Sheets

(56) References Cited

U.S. PATENT DOCUMENTS

| | | | |
|---|---|---|---|
| 2003/0229787 A1 | 12/2003 | Gabor | |
| 2005/0276229 A1* | 12/2005 | Torabi | H04L 67/16 370/252 |
| 2006/0077932 A1 | 4/2006 | Takeda et al. | |
| 2006/0155995 A1 | 7/2006 | Torvinen et al. | |
| 2006/0212700 A1* | 9/2006 | Zhang | H04L 63/08 713/167 |
| 2007/0097879 A1 | 5/2007 | Bleckert et al. | |
| 2008/0020704 A1* | 1/2008 | Costa | H04M 15/00 455/3.06 |
| 2008/0037481 A1* | 2/2008 | Chiang | H04L 12/4633 370/338 |
| 2008/0090555 A1* | 4/2008 | Patel | H04L 69/40 455/414.1 |
| 2008/0242274 A1* | 10/2008 | Swanburg | G06Q 20/3223 455/414.1 |
| 2008/0247385 A1* | 10/2008 | Witzel | H04L 65/104 370/352 |
| 2008/0317010 A1* | 12/2008 | Naqvi | H04L 65/1016 370/355 |
| 2009/0052415 A1* | 2/2009 | Ishii | H04W 40/20 370/338 |
| 2009/0086740 A1* | 4/2009 | Al-Bakri | H04L 65/1016 370/401 |
| 2009/0088129 A1* | 4/2009 | Cai | H04L 12/1403 455/406 |
| 2009/0098851 A1* | 4/2009 | Liebhart | H04L 29/06 455/404.1 |
| 2009/0150403 A1 | 6/2009 | Jerome et al. | |
| 2010/0030904 A1* | 2/2010 | Oda | H04L 65/1016 709/228 |
| 2010/0046501 A1* | 2/2010 | Witzel | H04W 8/06 370/352 |
| 2010/0106846 A1* | 4/2010 | Noldus | H04L 29/12094 709/229 |
| 2010/0128666 A1* | 5/2010 | Masson | G06Q 30/02 370/328 |
| 2010/0135204 A1* | 6/2010 | Witzel | H04L 67/16 370/328 |
| 2010/0150133 A1* | 6/2010 | Witzel | H04M 7/123 370/352 |
| 2010/0246444 A1* | 9/2010 | Witzel | H04W 8/06 370/255 |

OTHER PUBLICATIONS

"Digital cellular telecommunications system (Phase 2+); Universal Mobile Telecommunications System (UMTS); Numbering, addressing and identification (3GPP TS 23.003 version 6.14.0, Release 6); ETSI TS 123 003" ETSI STANDARDS, Sophia Antipolis Cedex, France, vol. 3-CN2;3-CN4. No. v6.14.0, Oct. 1, 2007.

Rosenberg, et al. "SIP: Session Initiation Protocol." Network Working Group. RFC 3261. Jun. 2002.

"IP Multimedia call control protocol based on Session Initiation Protocol (SIP) and Session Description Protocol (SOP)." 3'd Generation Partnership Project (3GPP) TS 24.229, V8.2.0., Stage 3, Release 8. Dec. 2007. Sophia Antipolis, France.

Aboba, et al.: "The Network Access Identifier". Network Working Group. RFC: 4282. Dec. 2005.

\* cited by examiner

METHOD OF ACCESS PROVISION

PRIORITY

This application is a continuation of pending U.S. patent application Ser. No. 12/810,878 filed on Jun. 28, 2010, now abandoned, which is a U.S. National Application filed under 35 U.S.C. 371 based on and claiming priority to International Application No. PCT/EP2007/064633 filed on Dec. 28, 2007. The contents of these documents are hereby incorporated by reference herein.

TECHNICAL FIELD

The present application relates to a method of providing a mobile terminal with access to a visited Internet Protocol based mobile communication network, to a corresponding mobile terminal and network entity of the IP based mobile communication network, and to corresponding control methods for the mobile terminal and network entity.

BACKGROUND

In the field of mobile communications so-called roaming allows a user to be reachable over different networks and thereby expand the service range beyond his home network. Roaming, i.e. the capability of a mobile terminal to not only access the home network of the user of the terminal but also other networks different from the home network, which are referred to as visited networks, has been possible mainly thanks to the proliferation of a specific technology all over the world, i.e. the Global System for Mobile communication (GSM), and standardized procedures for identifying and registering users in home and visited networks.

In recent years efforts have been made to provide communication services using networks based on the Internet Protocol (IP). An example of such a system is the so-called IP Multimedia Subsystem (IMS). In IMS networks roaming is also possible for terminals having subscription to an IMS network. If a terminal wants to register with a visited IMS network, it sends its own IMS identity that indicates has the form of a Uniform Resource Indicator (URI), i.e. points towards the home network as a domain for locating the home IMS subscription. The visited IMS network has a so-called Home Subscriber Server (HSS) for managing subscriptions of home subscribers and visiting subscribers that then contacts the home network, and provides service based on the IMS identity received from the visiting terminal.

The number of different telecommunication systems is increasing. These are not necessarily compatible with one another. Especially, even if a terminal has the technical capabilities of accessing different kinds of networks, e.g. is a "world" phone that supports different network accesses (e.g., GSM, UMTS, High Speed Packet Access (HSPA), and different radio frequency bands), and also may access to different telephony services such as circuit switched (CS) and packet switched (PS) services, then access to an IMS network still also requires the possession of a universally understandable IMS identity. However, this may not always be the case. For example, a subscriber of a pure GSM CS provider will only possess a Subscriber Identity Module (SIM) suitable for GSM or a module suitable for GSM and the Universal Mobile Telecommunications System (UMTS), which is referred to as a Universal SIM (USIM), and might only have a CS subscription with his home operator. There will then not be any IMS identity and hence no IMS subscription in a HSS, no "home" IMS network etc.

SUMMARY

The object or the invention is to provide improved methods and devices for providing access to IP based mobile communication systems.

This object is solved by the methods and devices described in the independent claims. Advantageous embodiments are described in the dependent claims.

According to an embodiment of the invention, a method is proposed for providing a mobile terminal associated with a user with access to a visited Internet Protocol based mobile communication network. An IP based mobile communication network is a network that uses IP as a network layer protocol. The mobile terminal generates a network information element that comprises a home network identifying element that identifies a home network of the user, and a domain name of the visited IP based mobile communication network as a base domain identifier. The base domain is highest domain for locating a resource. Therefore, the network information element identifies the visited IP based mobile communication system as its domain. The mobile terminal then provides this special network information element to the visited IP based mobile communication network, which executes a subscription generating procedure for generating a subscription for the user upon recognizing the special network information element (i.e. the presence of information indicating a different network than the visited network, but combined with a domain name of the visited network) and provides the mobile terminal access based on the generated subscription.

In other words, in order to allow access, the mobile terminal generates a specific type of network information element, and the IP based network is arranged to recognize this specific type of network information element, in order to generate a subscription (e.g. only a temporary subscription) for providing service to the terminal. As the network information element comprises a proper domain name (that of the visited network), the element can be processed according to the established procedures of the IP based network, despite the possibility that the combined information element is not registered anywhere. In this way access to the IP based mobile communication system can be provided even if no specific identity in IP context (e.g. an IMS identity) exists for the user, e.g. because the home network has no domain name, i.e. is not identified within the IP context. In this way, a subscriber of an arbitrary home network, e.g. of a purely circuit switched home network, can obtain access to an IP based communication network. It should, however, be noted that the inventive mechanism is generally applicable, i.e. will also work if such an IP context identity exists for the user of the mobile terminal.

According to a further embodiment, a mobile terminal and method of controlling a mobile terminal is proposed. The mobile terminal comprises a transceiver and a controller. The controller is arranged for communication via the transceiver with a home network of a user of the mobile communication terminal. It is also arranged for communication via the transceiver with a visited Internet Protocol based mobile communication network. In other words, the terminal has hardware and software that enables communication with a home network (e.g. a CS network) and a visited IP based mobile communication network (e.g. an IMS network). The controller comprises a network registration control part arranged for generating a network information element that comprises a home network identifying element that identifies a home network of said user, and a domain name of the visited IP based mobile communication network as a base domain identifier. The controller is furthermore arranged for providing the network information element to the visited IP based mobile communication network.

According to a further embodiment, a network entity of an Internet Protocol based mobile communication network and method of controlling such a network entity are proposed. The entity comprises a transceiver and a controller, where the controller is arranged to receive via the transceiver a network information element provided by a mobile terminal. The controller comprises a processing part for analyzing the network information element. The network entity is characterized in that the controller is arranged for recognizing whether the network information element comprises a home network identifying element that identifies a home network of a user of the mobile terminal and a domain name of said IP based mobile communication network as a base domain identifier. The home network is different from said IP based mobile communication network. The controller is furthermore arranged for executing a subscription generating procedure for generating a subscription for the user upon recognizing that the network information element comprises the home network identifying element and the home network identifying part.

BRIEF DESCRIPTION OF THE DRAWINGS

Examples of the present invention will now be described with reference to the drawings, which show.

DETAILED DESCRIPTION

Now detailed examples of the invention will be described. It should be noted that reference will sometimes be made to specific types of networks (such as IMS) and specific protocols (such as the Session Initiation Protocol (SIP)), but this only serves to make the general invention easier to understand and to indicate advantageous applications of the inventive concepts, but is not in any way meant to be limiting, as the invention is defined by the appended claims.

Figure 2:
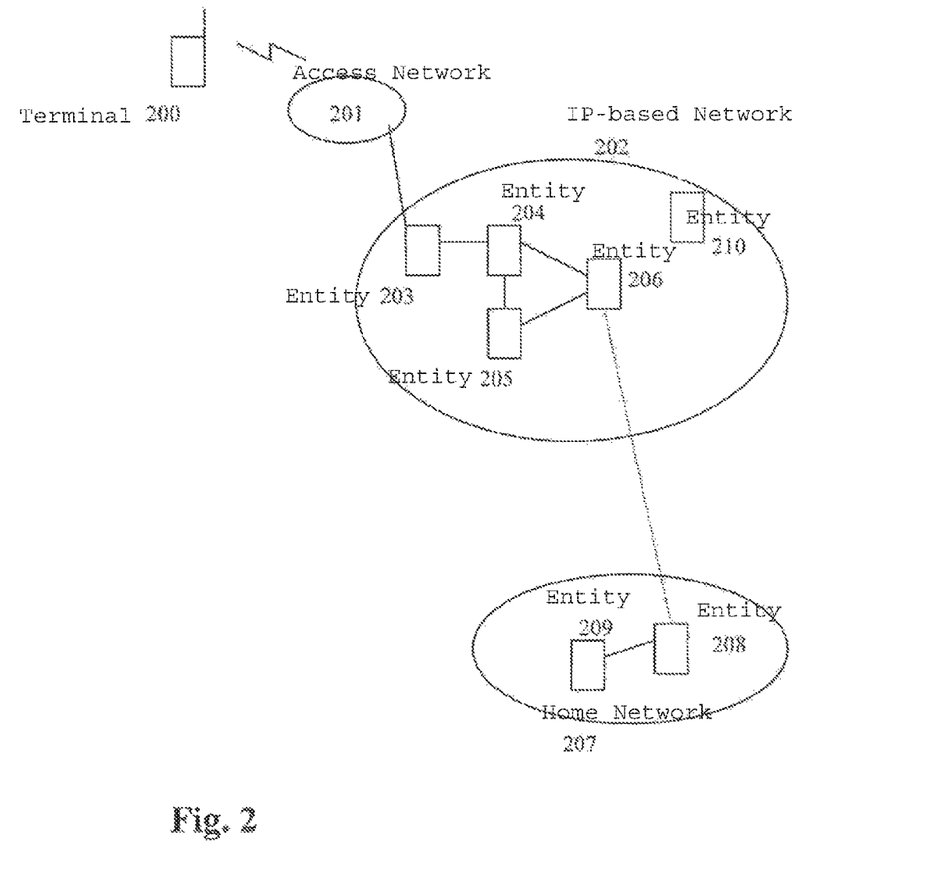
FIG. 2 shows a communication system capable of implementing an embodiment of the present invention.

FIG. 2 shows a schematic representation of a mobile communication system comprising a terminal 200 and a visited IP based communication network 202. The terminal 200 communicates with an access network 201 that in turn communicates with the IP based network 202. The network 202 may have one or more entities 203-206 and 210 for providing predetermined functionalities. The term entity refers to an element that can be a unit (such as a server) or several units for providing a given functionality. Such a basic architecture is well known, such that no further description is necessary. Network 202 may e.g. be an IP based mobile communication network that uses the Session Initiation Protocol (SIP) and Session Description Protocol (SDP) for session management, such as an IMS network. Mobile terminal 200 is then suitably arranged for being able to communicate in accordance with the procedures of network 202, e.g. implements an SIP user agent.

Figure 1:
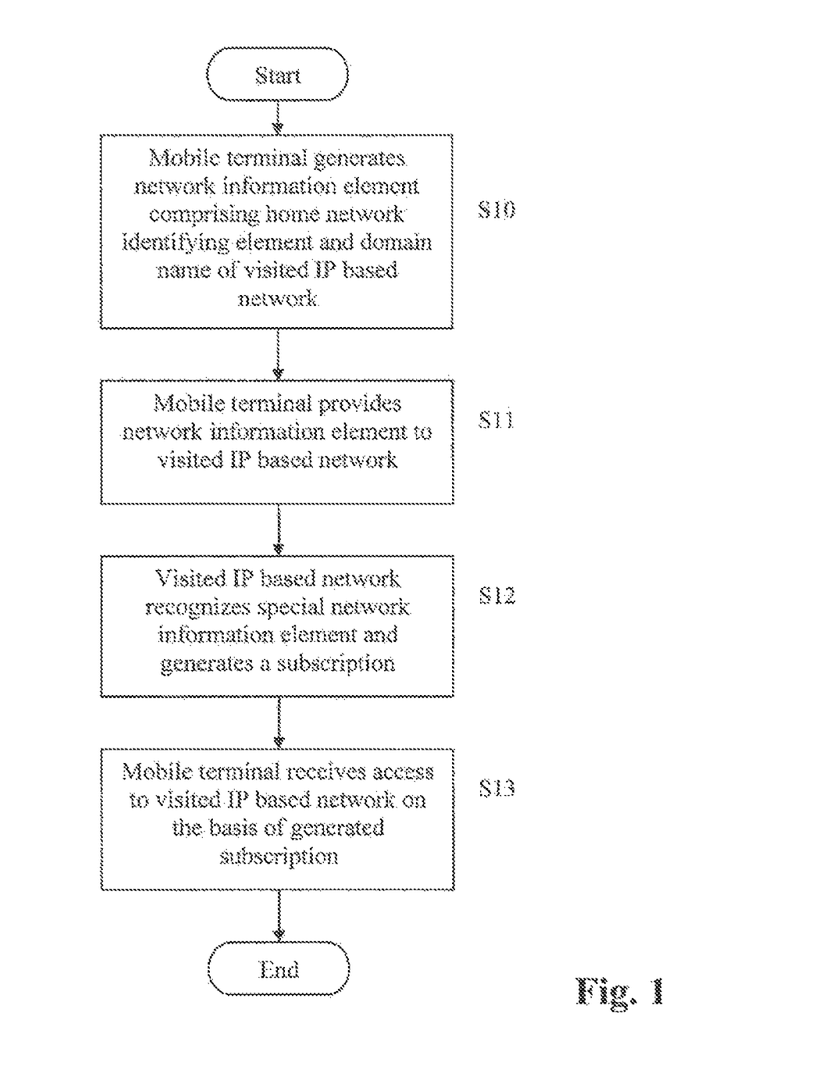
FIG. 1 shows a flow chart of a method embodiment of the invention.

FIG. 1 shows a basic method embodiment of the invention. Mobile terminal 200 is associated with a roaming user, i.e. the user does not have a subscription with network 202, but with a different mobile communication network shown schematically as 207 in FIG. 2. In step S10 the roaming mobile terminal 200 generates a network information element that comprises a home network identifying element that identifies a home network of its user, and a domain name of the visited IP based mobile communication network 202 as a base domain identifier. The base domain is highest domain for locating a resource. Therefore, the network information element identifies the visited IP based mobile communication system as its domain.

The network information element can e.g. be an identity string. It can have any form suitable for being processed by the IP based network 202, e.g. can have the form of a URI. The home network identifying element can be chosen in any suitable or desirable form. For example, it can combine one or more information pieces that allow the visited network 202 to recognize that the user's home network is not network 202. Examples of such information pieces are the Mobile Country Code (MCC), Mobile Network Code (MNC), Mobile Subscriber Identification Number (MSIN), Mobile Subscriber International ISDN Number (MSISDN) and the International Mobile Subscriber Identity (IMSI). For example, the network information element may schematically have the form <IMSI>@ims.mnc<MNC>.mcc<MCC>.<operator 202>.com, where <IMSI> represents a string identical to the user's IMSI, <MNC> represents a string identical to the user's MNC, <MCC> represents a string identical to the user's MCC and <operator 202> represents a string identical to a domain name of the operator of IP based communication network 202. As can be seen, the domain name <operator 202> is the base domain, as it immediately precedes the root "com" and stands for the top-level domain.

In step S11 the mobile terminal 200 provides this special network information element to the visited IP based mobile communication network 202. Network 202 in turn executes a subscription generating procedure for generating a subscription for the user upon recognizing the special network information element, see step S12, and access is provided to the roaming mobile terminal 200 based on the generated subscription, see step S13.

The step of recognizing the special network information element with the two parts, one identifying the domain name of network 202 and the other indicating a different network, can be done in one or more entities of the network 202. For example, network 202 may have an entity responsible for subscription handling, such as the HSS known from IMS. This entity can preferably perform the recognition. Due to the fact that the network information element uses the domain of network 202, other entities of network 202 that are possibly involved in the processing of information from mobile terminal 200 can route and forward the information element according to standard procedures.

The subscription can be generated in any suitable or desirable way. It can be unconditional after recognizing the special network information element, or it can depend on further conditions, e.g. that the user is successfully authenticated. Furthermore, the subscription can for example be a default subscription using default parameters. Such a default subscription could consist in setting default service parameters and generating an identity for the IP based network 202 using the network information element, e.g. setting an identity string equal to the network information element if it has the proper format of a URI. Such a subscription could be quite restricted and e.g. only allow the mobile terminal 200 to make outgoing calls but not to receive any calls. The establishment of such a default subscription does not require contacting the home network of the user.

Preferably, however, the visited IP based network communicates with the home network 207 of the user on the basis of information in said home network identifying element, for obtaining home subscription data related to said user's home network subscription. This is shown in FIG. 2, where home network 207 has a subscription handling entity 208 that is contacted by subscription handling entity 206 of network 202 using one or more of the information pieces contained in the home network identifying element of the network information element. Network 207 can e.g. be a GSM network, and entity 208 can be a Home Location Register (HLR).

The home subscription data can relate to various aspects of the home subscription and can be used for various purposes in the visited IP based network 202. For example, at least parts of the obtained home subscription data can be used for generating one or more identity strings for the subscription in the IP based network 202. If for example the network information element does not contain the user's MSISDN, then it is possible for entity 206 to obtain the MSISDN from home network 207 and generate a corresponding identity string, e.g. an IMS Public User Identity (IMPU). Other examples of identity strings that can be generated using information from the network information element and/or home subscription data obtained form the home network are a telephone URI (Tel URI), and a SIP URI. For example, such an identity string could be: sip: msisdn@visited_operator.com; user=phone The home subscription data may also comprise authentication information. The subscription generation procedure S12 may then comprise a routine for authenticating the user on the basis of the authentication information.

The authentication procedure can be conducted in any suitable or desirable way. For example, an Authentication and Key Agreement (AKA) can be used. If the network 202 is an IMS network, then the IMS AKA can be used. An AKA uses keys for both encryption (i.e. securing communication) and authentication. In addition or alternatively to using an AKA, an embodiment of the present invention may also conduct the authentication in a two-step procedure, where securing communication and the actual authentication are separated. More specifically, the procedure comprises first establishing a secured communication channel between the mobile terminal 200 and the visited IP based mobile communication network 202 independently of the home subscription data using a suitable communication securing protocol, and then exchanging authentication related messages over the secured communication channel. The communication securing protocol can e.g. be one of the Transport Layer Security (TLS) protocol and the Secure Sockets Layer (SSL) protocol. The advantage of this solution for authentication, is that even if the authentication data received from the home network 207 is not fully suitable for securing communication, a secure authentication can be performed. Preferably, the authentication related messages convey authentication information suitable for the terminal as a tunnelling through the secured connection and using an authentication protocol or mechanism of the IP based mobile communication network. This can e.g. be the case if home network 207 is a second generation (2G) GSM network, as the encryption keys used in 2G networks and SIMs are generally short and therefore questionable in terms of security. Then, the 2G authentication parameter RAND to be communicated to a terminal can e.g. be tunnelled over the secure connection using the IMS Digest mechanism.

The home subscription data may also comprise home network service settings information, and the subscription generating procedure S12 may comprise a step of generating for the subscription in the visited IP based network 202 visited network service settings in accordance with a service settings information format of the visited IP based mobile communication network, using this home network service settings information. This can be done in any suitable or desirable way and will generally depend on the specific nature of the visited IP based network 202 and the home network 207. More detailed examples will be presented further on.

According to a further embodiment, the visited Internet Protocol based mobile communication network is arranged for sending an addressing indicator to the home network for routing incoming calls for the user. This can be done by default when the subscription is generated and/or upon request from the home network (e.g. using a Provide Roaming Number (PRN) request). The home network can then use the addressing indicator, which addresses an entity (for example application server 210) in IP based network 202 responsible for providing telephone service to the mobile terminal 200, for routing incoming calls.

Figure 4:
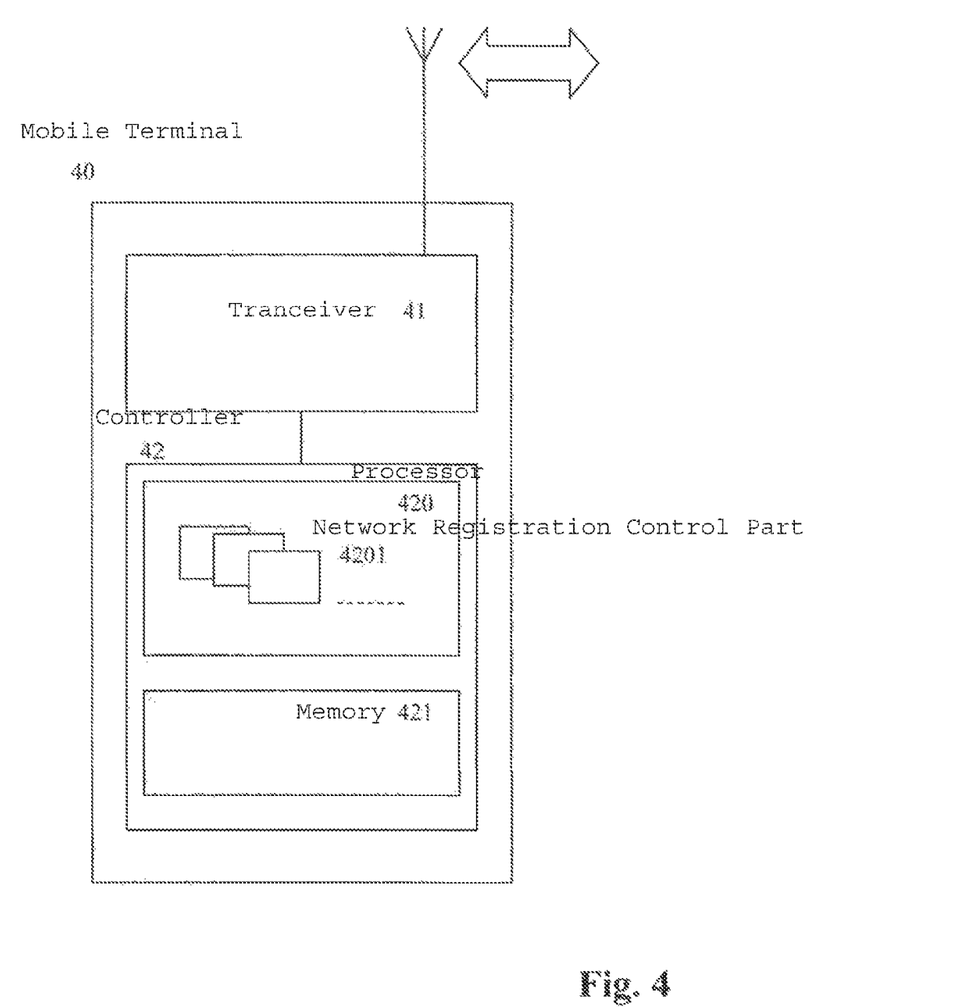
FIG. 4 shows a schematic representation of a mobile terminal according to an embodiment of the invention.

FIG. 4 shows a schematic example of a mobile terminal according to an embodiment of the invention. Mobile terminal 40 comprises a transceiver 41 and a controller 42. The controller 42 is arranged for communication via the transceiver 41 with a home network of a user of the mobile communication terminal 40 and for communication via the transceiver 41 with a visited Internet Protocol based mobile communication network, such as network 202 shown in FIG. 2.

Transceiver 41 is arranged in conventional manner and e.g. has an antenna as shown in FIG. 4, for sending and receiving signals (see arrow at the top of the figure). Controller 42 is arranged for controlling the operations of the terminal and comprises a processor 420 and a memory 421. Both elements are shown schematically, and can themselves consist of one or more units. Processor 420 can e.g. be a programmable processor running software stored in memory 421, and memory 421 may comprise a program memory, a parameter memory and separate therefrom an identity module, such as a SIM or USIM. Such elements are conventionally known, such that a further description is not necessary. Furthermore, terminal 40 will generally also comprise further conventional elements like a keyboard, display, etc., which are not described for simplicity.

In accordance with this present embodiment, the controller 42 comprising a network registration control part 4201 arranged for generating a network information element that comprises a home network identifying element that identifies a home network of the user of the terminal, and a domain name of the visited IP based mobile communication network as a base domain identifier, and for providing this network information element to the visited IP based mobile communication network. Part 4201 is shown in processor 420, and can be hardware, software or any suitable combination of hardware and software. For example, the network registration control part 4201 can be a computer code part of a computer program executed on processor 420.

Figure 5:
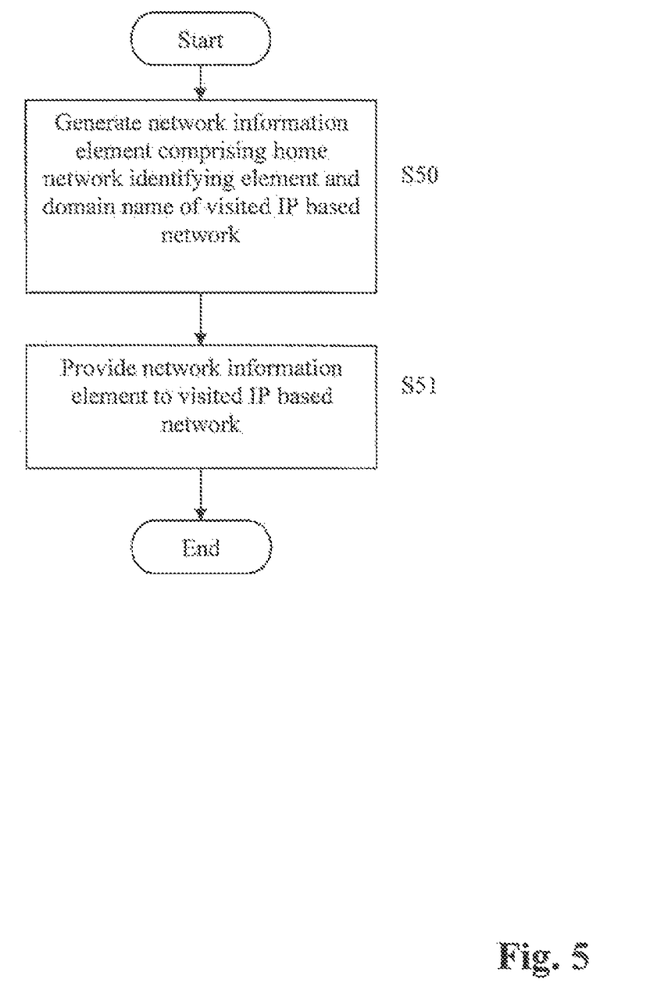
FIG. 5 shows a flow chart of a method for controlling a mobile terminal according to an embodiment of the invention.

FIG. 5 shows a flow chart for a method of control of a mobile terminal such as terminal 40. The method of controlling a mobile terminal comprises a step S50 of generating a network information element that comprises a home network identifying element that identifies the home network of the user, and a domain name of said visited IP based mobile communication network as a base domain identifier. The generated network information element is then provided to the visited IP based mobile communication network in step S52. The described control method can be embodied as a computer program comprising computer code parts designed for executing the described steps when executed on a mobile communication terminal, e.g. in processor 420 of terminal 40 of FIG. 4. The concept can also be embodied as a data carrier storing such a computer program.

Figure 6:
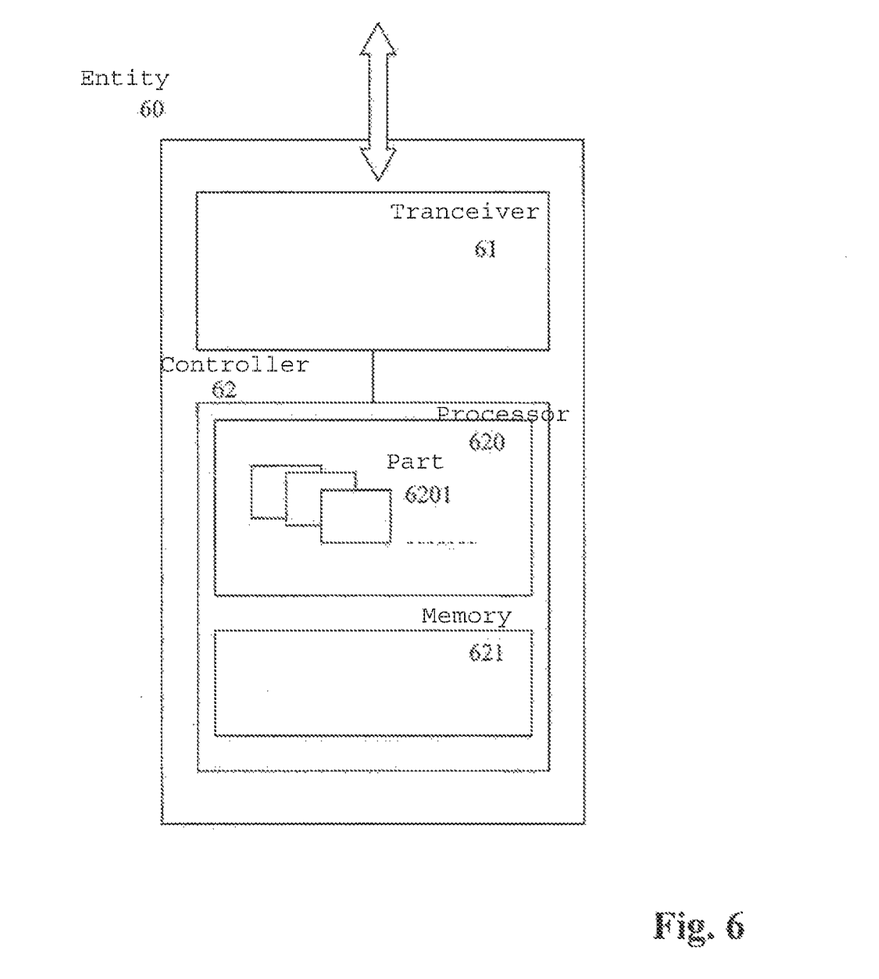
FIG. 6 shows a schematic representation of a network entity of an IP based mobile communication network according to an embodiment of the present invention.

FIG. 6 shows a schematic example of an entity 60 (e.g. a server) of an Internet Protocol based mobile communication network. For example, entity 60 could be a subscription entity 206 as shown in FIG. 2. If the IP based network is an IMS, then entity 60 can be a HSS or an Application Server (AS), such as a Telephony AS (TAS).

Entity 60 comprises a transceiver 61 and a controller 62, where the controller 62 is arranged to receive via the transceiver 61 a network information element provided by a mobile terminal. Transceiver 61 is arranged in conventional manner for sending and receiving signals (see arrow at the top of the figure). Controller 62 is arranged for controlling the operations of the entity 60 and comprises a processor 620 and a memory 621. Both elements are shown schematically, and can themselves consist of one or more units. Processor 620 can e.g. be a programmable processor running software stored in memory 621, and memory 621 may comprise a program memory, a parameter memory and possible further parts. Such elements are conventionally known in the field of network servers, such that a further description is not necessary.

The controller 60 is arranged for recognizing whether the received network information element comprises a home network identifying element that identifies a home network of a user of the mobile terminal and a domain name of said IP based mobile communication network as a base domain identifier, where the home network is different from said IP based mobile communication network, and for executing a subscription generating procedure for generating a subscription for the user upon recognizing that the network information element comprises the home network identifying element relating to a different network than the IP based network and the described domain name of the IP based network. For example, a part 6201 can be provided in processor 620 for performing the recognition and the possible subscription generation procedure. Part 6201 can be hardware, software or any suitable combination of hardware and software. For example, the part 6201 can be a computer code part of a computer program executed on processor 620.

Figure 7:
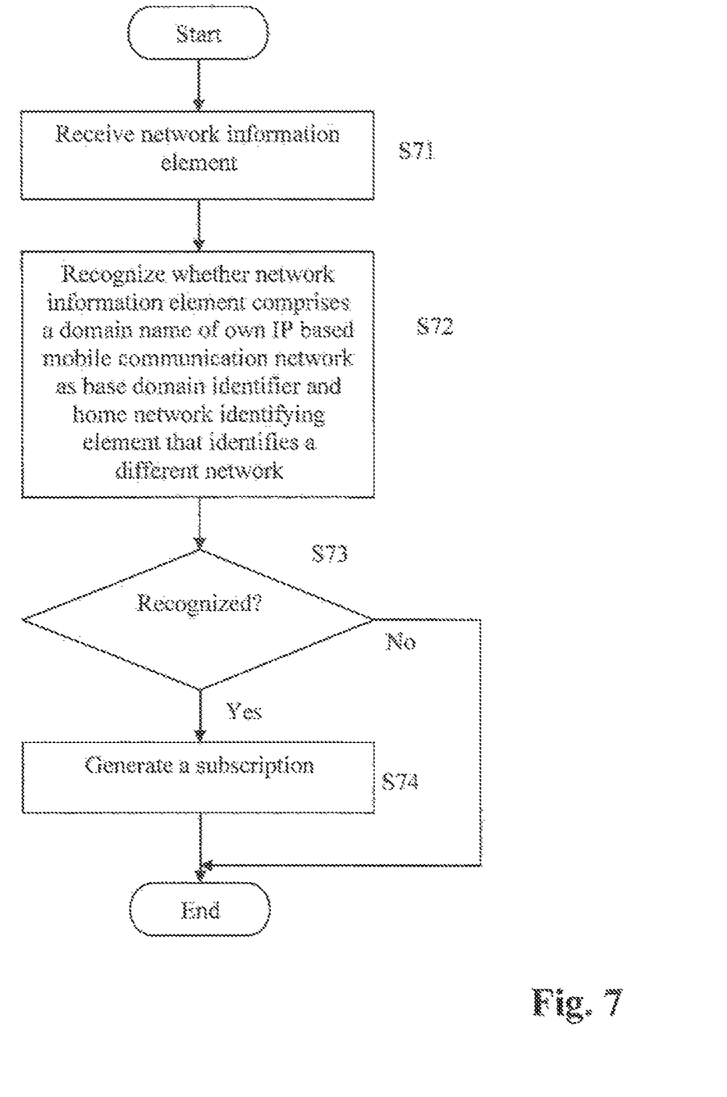
FIG. 7 shows a flow chart of a method for controlling a network entity of an IP based mobile communication network according to an embodiment of the present invention.

FIG. 7 shows a flow chart for a method of control of a network entity of an Internet Protocol based mobile communication network, such as entity 60. The method comprises receiving a network information element in step S71. In step S72 it is recognized whether the network information element comprises a home network identifying element that identifies a home network of a user of the mobile terminal and a domain name of the IP based mobile communication network as a base domain identifier, where said home network is different from said IP based mobile communication network. In step S73 it is determined whether the received network information element fulfils the condition of step S72, and executing a subscription generating procedure S74 for generating a subscription for the user upon recognizing that the network information element comprises the home network identifying element relating to a different network than the IP based network and a domain name of the IP based network.

Both the entity of FIG. 6 and the method of FIG. 7 can be embodied to have one or more of the features and functionalities described in connection with IP based mobile communication network 202 of FIG. 2, e.g. the capability to contact the user's home network and obtain various kinds of subscription related information, such that a renewed description is not necessary.

The described control method of FIG. 7 can be embodied as a computer program comprising computer code parts designed for executing the described steps when executed on a mobile communication terminal, e.g. in processor 620 of entity 60 of FIG. 6. The concept can also be embodied as a data carrier storing such a computer program.

Now further examples of embodiments of the invention will be described, which specifically relate to a roaming mobile terminal attempting to register with a visited IMS network. The example uses the preferred feature of communicating with the user's home network. IMS is known and e.g. described in RFC 3261 and 3GPP TS 24.229, and in many other documents, such that a detailed description of IMS and its elements is not necessary.

The present example comprises:
- the roaming terminal detecting the visited IMS network,
- the terminal creating a temporary IMS identity (as an example of the network information element) that can be understood by the visited IMS network,
- the terminal using the temporary IMS identity to register to the visited IMS network,
- the visited IMS network, based on the temporary IMS identity, locating and contacting the home network (e.g. a CS network) to obtain GSM/UMTS subscriber data, such as MSISDN, and authentication vectors, and
- the visited IMS network creating a (possibly temporary) subscription in case the user is successfully authenticated.

This will be explained in more detail with reference to FIG. 2, where it is assumed in the present example that network 202 is an IMS network comprising a Proxy Call State Control Function (P-CSCF) 203, an Interrogating CSCF (I-CSCF) 204, a Serving CSCF (S-CSCF) 205 and a HSS 206. Furthermore, a TAS 210 is shown, which is capable of communication with each of the CSCFs and the HSS. Furthermore, the present example assumes home network 207 to be a CS network comprising an HLR 208 and an MSC 209. Terminal 200 is assumed to implement the functions of a User Equipment (UE) for communicating with an IMS network.

1) To start with, the UE detects the IMS network it wants to roam to. This could be done by the UE dynamically trying to fetch information of the current IMS availability in the local network by applying known standard P-CSCF discovery procedures, e.g. contacting a Domain Name Server (DNS) and using a Dynamic Host Configuration Protocol (DHCP). An alternative could be that the terminal is already configured with the IMS providers the UE is allowed to roam to.

2) When the UE has detected a local IMS network that it may use, it registers with the IMS network using the concepts of the present invention. The UE is assumed to not contain an IMS SIM (ISIM), hence not have any dedicated IMS identities. In the present example it is assumed that the home operator domain is not routable through IMS. If the home operator would have been IMS enabled, the UE could have conventionally created the IMS identities for registration based on the IMSI and the mnc and mcc information on the SIM or USIM (IMSI=MCC+MNC+MSIN), i.e. <IMSI>@ims.mnc<MNC>.mcc<MCC>.3gppnetwork.org. 3gppnetwork.org would be the domain name of the user's home network, i.e. an network that is IP routable. The domain name part would then uniquely define the home operator. However, considering that in the present example it is assumed that the home operator domain is not routable through IMS, and the roaming IMS network is not administrating the domain name, such identity would not be possible to route in visited IMS network.

According to one of the concepts of the present invention, a different identity is created in this example, which can be routed in the visited IMS network. For example: <IMSI>@ims.mnc<MMC>.mcc<MCC>.msin.operator1.com, where operator1.com is the domain name of the visited IMS operator.

3) The UE can then initiate normal IMS registration procedures towards the P-CSCF 203 based on the specially derived identity for registration. Note that the identity can be used both as a private user identity and as a public user identity.

4) The P-CSCF 203 then interacts with the I-CSCF 204 during the registration procedures.

5) The I-CSCF 204 contacts the HSS 206, possibly by first contacting the Subscription Locator Function (SLF) to receive the address of the serving HSS 206, to locate an S-CSCF that can handle the user. At this stage the user will not have a subscription in the HSS. But instead of rejecting the query, the HSS 206 will check the domain name part (ims.mnc<MNC>.mcc<MCC>.operator1.com) and so by virtue of a concept of the present invention recognize that this is a roaming subscriber not currently registered. As the user is considered to be a roaming subscriber, an S-CSCF 205 is allocated.

The allocation can be done in any suitable or desirable way. For example, the chosen HSS 206 and S-CSCF 205 may be dedicated by default to support the roaming subscribers, where an SLF could choose the HSS based on the specific domain name allocated to the user (UE).

6) The I-CSCF 204 sends the register to the S-CSCF 205.

7) The S-CSCF 205 interacts with the HSS 206, and in particular to receive authentication information. But also to optionally receive the service profile of the user, and the implicit registration set if available. These interactions are handled at different points in time, though. When the authentication information is received, the S-CSCF 205 challenges the user, and in principle can repeat steps 1-7, but with the authentication taking place according to the known standard procedures.

8) When the HSS 206 receives the initial request from the S-CSCF 205, the HSS 206 contacts the HLR 208 to receive information about the roaming user. In particular, authentication vectors, and MSISDN may be received.

9) If the authentication has been successful and the S-CSCF 205 tries to download the subscriber profile and IMPLICIT REGISTRATION SET etc, the HSS 206 can create a local subscription for the roaming user with default service settings.

Figure 3:
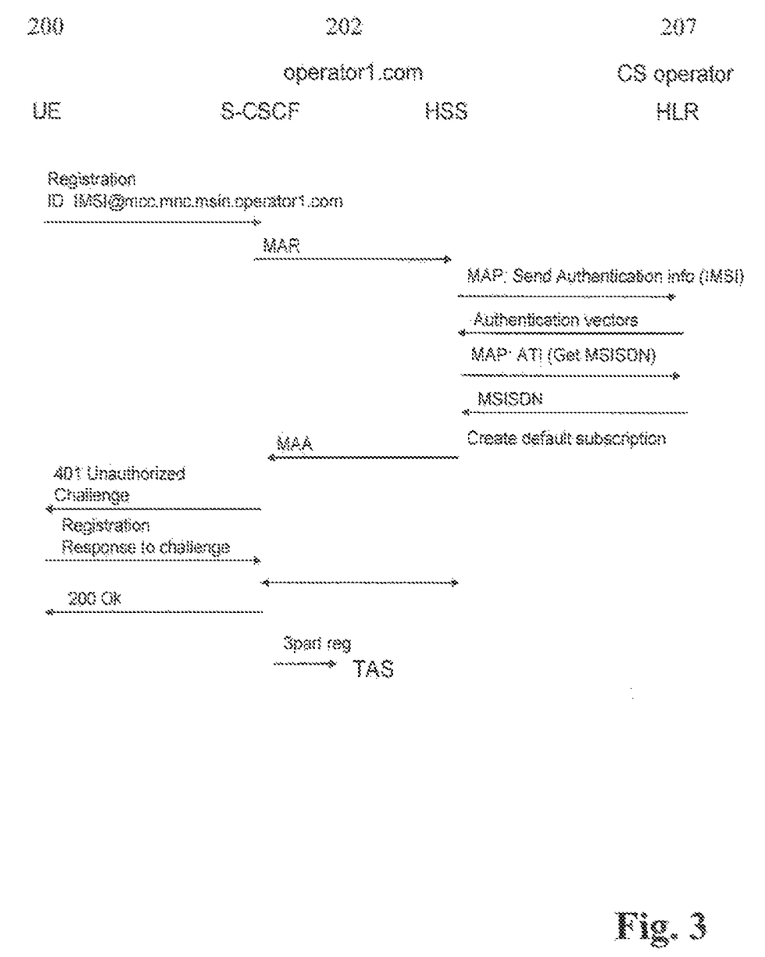
FIG. 3 shows an example of a communication exchange between elements of FIG. 2 in accordance with an embodiment of the invention.

FIG. 3 shows in more detail some of the communication that may take place. The Figure shows the US in terminal 200, the S-CSCF and HSS in IMS 202 and the HLR in home network 207, assumed here to be a CS network. The flow of time is indicated from top to bottom. As can be seen, the UE first sends a registration with the new type of identity. (Alternatively, if the network information element does not have the format of an identity, then the S-CSCF and/or HSS can generate an identity string using the information in the network information element sent by the UE). The S-CSCF then send a Multimedia Authentication Request (MAR) to the HSS, which in turn requests and obtains authentication vectors and the MSISDN from the HLR of the home network. The HSS then creates a subscription, which comprises generating a user profile, e.g. using default settings and/or information obtained from the HLR 208, and sends Multimedia Authentication Answer (MAA) to the S-CSCF. The S-CSCF then challenges the UE, which responds with a registration request. Based on the newly created subscription and new identity, access can be provided based on the new subscription using known and established procedures in the IMS network. As shown at the bottom, the Telephony Application Server (TAS) handles the telephony service after the Third Party Register based on the new subscription.

Differences to known procedures consist in the new identity being used in the register, the interaction with HLR, and the (possibly temporary) subscriber profile that is created when the user is being registered.

According to a further aspect, different mechanisms can be used for giving the roaming user access to local services, which comprises contacting the home network in order to obtain user settings and assigning corresponding IMS services.

The basic principle that apply is that the Supplementary Service (SS) information from the home network is downloaded and then converted into the local service information format, e.g., for IMS Multimedia telephony.

Figure 8:
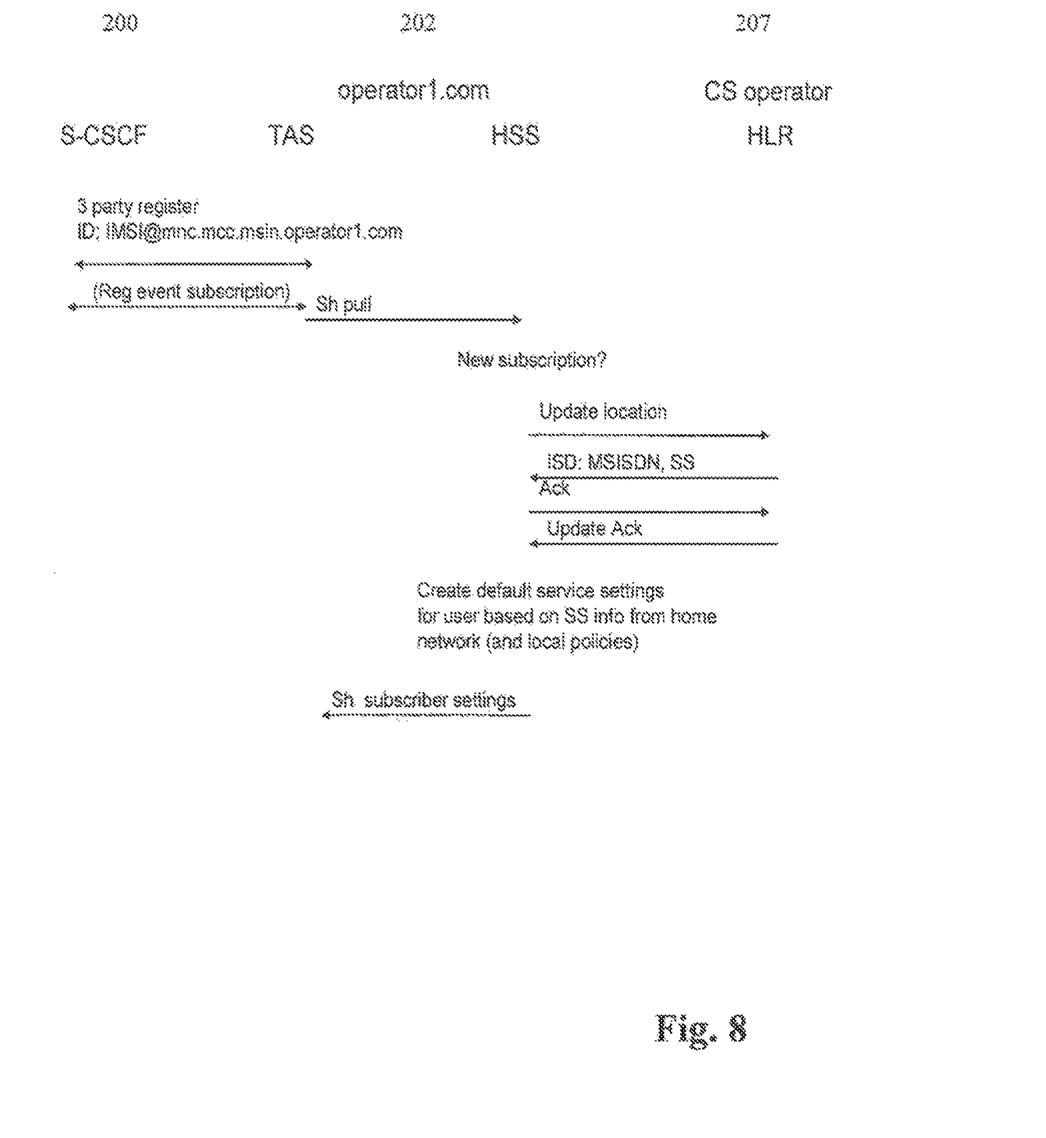
FIG. 8 shows an example of a communication exchange between elements of FIG. 2 for obtaining subscriber information from a home network in accordance with an embodiment of the invention.

FIG. 8 shows a scenario where the TAS tries to receive the subscriber information for the service after the Third Party Register shown at the bottom of FIG. 3 and again shown at the top of FIG. 8.

The TAS sends a pull using the IMS Sh interface (Sh pull) to the HSS. The HSS detects or recognizes that no settings exist, and also detects that the user is a roaming CS user. As one possibility, the HSS could set fixed default settings without contacting the home network. But preferably, as shown in FIG. 8, the HSS contacts the HLR in the user's home network to receive supplementary service information/settings. The HSS creates a setting for the service based on the received information and forwards this to the TAS with a Sh response.

Figure 9:
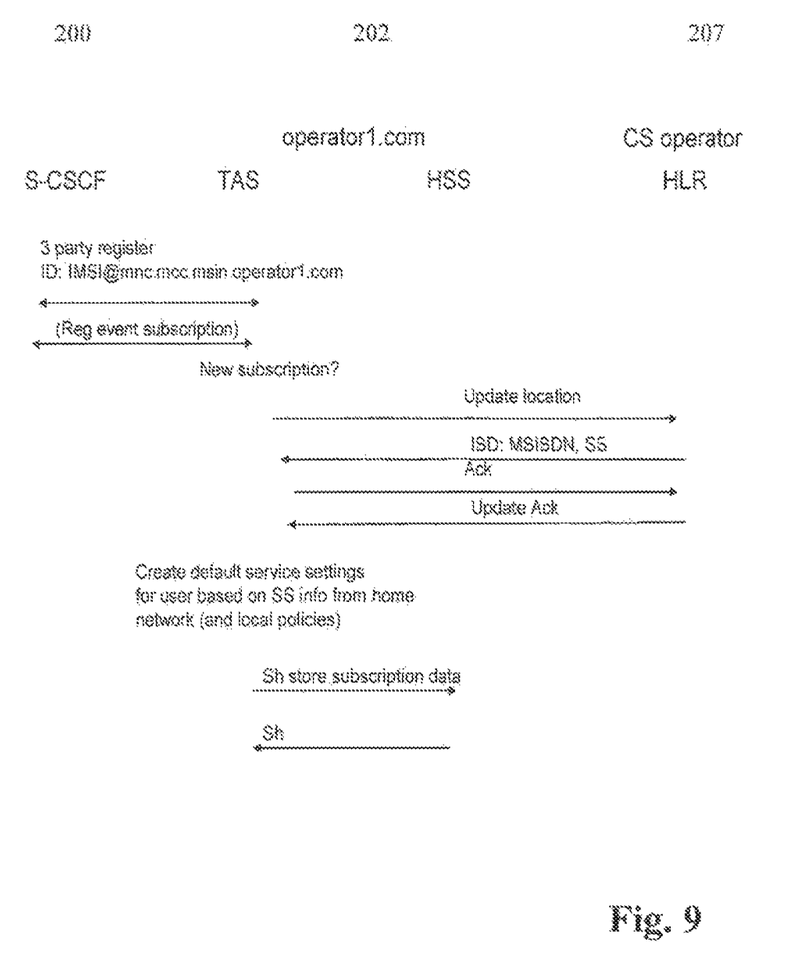
FIG. 9 shows another example of a communication exchange between elements of FIG. 2 for obtaining subscriber information from a home network in accordance with an embodiment of the invention.

Alternatively, the HSS may perform an Update Location operation prior to completing the IMS Register procedure, as shown in FIG. 9. In this scenario, it is the TAS that detects that the user is new (upon reception of the Third Party Register from the S-CSCF) and does not have any default subscription data. It also detects that the user is a CS subscriber (based on the identity), and therefore directly contacts the roaming user's HLR to retrieve the SS information available for the user. The roaming user's HLR is e.g. found by composing an E.214 number from the IMSI part of the identities received in the Third Party Register. E.214: MCC+MNC may be translated into CC+NDC of the E.164 numbering plan, and MSIN from IMSI may be added after these. The user is then able to use the service with same settings as in the home CS network.

If the settings are updated, these can be communicated to the HLR in the same manner.

When the UE receives Telephony services in the visited IMS network, a preferable option is that it also becomes reachable based on its MSISDN number it has in the home CS network. If so, the MSISDN will be used as public user identity in the visited IMS network and included in the newly created subscription in the IMS network. This would then allow the UE to place calls using this identity.

To receive incoming calls based on this MSISDN, it is however required that the gateway Mobile Switching Center (gMSC) in home network 207 can route incoming calls to the visited IMS network. This is solved by letting the gateway Mobile Switching Center (gMSC) in home network 207 query the HLR for placing a call, whereupon the HLR can send a Provide Roaming Number (PRN) request to the HSS or TAS of IMS 202, and IMS 202 responds with the TAS number as a Mobile Station Roaming Number (MSRN), in order to enable the CS home network to route the call to the IMS network. The TAS number, which is an example of an addressing indicator, is a temporary number addressing the TAS, and allocated for the specific user being called. The TAS number, as being a MSRN, has the same structure as international ISDN numbers. The gMSC routes the call to the TAS number. When receiving the incoming call, the TAS will be able to correlate the TAS number with the MSISDN of the user, and subsequently also the public user identity of the user in the visited IMS network. The TAS can then continue routing the call to the user based on the IMS IMPU using normal IMS routing procedures.

As already mentioned earlier, the methods and devices of the present invention may employ authentication procedures. In the following, an example for conducting a preferred authentication of a second generation (2G) subscriber in an IMS network will be described with reference to FIG. 10. To ensure a high security level, this example proposes to only use the 2G SIM in the terminal for authentication purposes, but not for directly securing the communication (e.g. encryption of data). This is different from IMS AKA, where the USIM/ISIM keys are used both to authenticate and secure the signaling traffic.

The reason for this is to ensure that the protection of the communication can be done based on currently viewed secure protocols.

Figure 10:
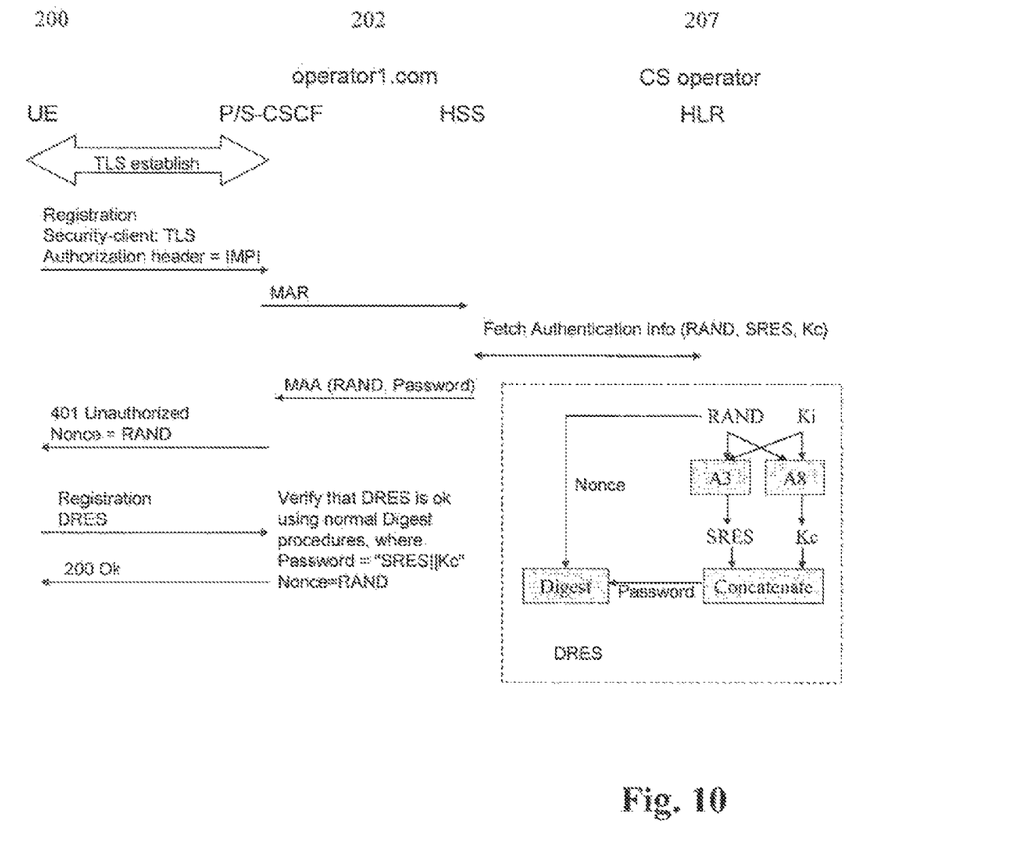
FIG. 10 shows an example of a communication exchange between elements of FIG. 2 for authenticating the user in accordance with an embodiment of the invention.

The procedures may be as follows:

1) Before sending the first registration message, the UE sets up e.g. a TLS connection with the P-CSCF based on a server side certificate. This is done without needing to involve the SIM. Then, all further communication is sent over the thus protected channel.

2) The UE registers to the IMS system. It uses the security agreement method, and indicates that it supports TLS only. It also includes the Authorization header with the IMPI as username to indicate it would like to use the so-called Digest authentication known for IMS. Naturally, this, is only an example and other forms of authentication are possible.

3) The S-CSCF detects that Digest authentication is supposed to be used, and queries the HSS with an MAR.

4) The HSS can then, based on the identity of the user, detect that this is not a normal IMS subscriber, but a 2G user. It locates the responsible HLR and queries the HLR to receive the triplet for authentication (RAND, SRES, Kc). As indicated at the bottom of the right hand-side of FIG. 10, SRES and Kc are derived from a random, number RAND and an internal key Ki using two algorithms A3 and A8, as defined in ETSI TS 100 929 or GSM 03.20, such that: a further description is not necessary here. Based on the SRES and Kc, which are used by the 2G system for authentication and thereby suitable for authentication of the 2G SIM in the terminal, the HSS creates a password based on SRES and Kc (e.g. by concatenation) that can be used for the Digest authentication in IMS.

5) It sends the information back to S-CSCF in an answer MAA, which uses the RAND to challenge the user. This is done using normal SIP Digest, but where the RAND is used as the parameter nonce.

6) The UE receives the Digest challenge, and calculates a response. The UE uses the nonce (RAND) to query the SIM for SRES and Kc. It then uses SRES and Kc as "Password" for the SIP Digest authentication to calculate a response (DRES).

7) When S-CSCF receives the response it can also calculate the expected result based on its own Password and RAND. If this matches the DRES received from the user, the user is successfully authenticated.

This is only an example of the possible signaling flow, and alternatives are possible. For example, if the S-CSCF is not trusted to receive the Password, the HSS may only send a derivate of this to the S-CSCF according to the Digest RFC. Yet another option is that only the RAND is sent from HSS to S-CSCF and instead of doing the Digest verification in the S-CSCF (step 7), the S-CSCF sends the DRES to the HSS for verification.

In summary, the 2G authentication information can be tunnelled using an IMS authentication procedure, e.g. the SIP Digest authentication procedure.

The various embodiments described above can provide numerous advantages over known solutions. For example, non-IP based providers (e.g. CS providers) from one country may offer their users the possibility to roam into a pure PS network to receive telephony services via IMS. The possibilities to migrate towards IMS in one country are increased, without the need to keep old non-IMS networks to provide access to roaming users. Embodiments of the invention can also be used an easy means to migrate local users to IMS as well.

The invention claimed is:

1. A server of an Internet Protocol (IP) Multimedia Subsystem (IMS) mobile communication network, comprising:
 a transceiver; and
 a controller, wherein the controller further comprises:
  a microprocessor, and
  a computer-readable storage medium, coupled to the microprocessor, including computer-readable instructions, when executed by the microprocessor, are configured to:
   receive, via the transceiver and from a mobile terminal, a network information element, wherein
    the network information element comprises a home network identifying element that identifies a home network of the mobile terminal, and
    the mobile terminal does not have any dedicated IMS mobile communication identities and no IMS subscriptions in the home network, receive, via the transceiver and from the home network, home subscription data related to a home network subscription of the mobile terminal, responsive to receiving the network information element, execute an IMS subscription generating procedure for generating an IMS subscription using the home subscription data, wherein the IMS subscription comprises a user profile upon recognizing the network information element, and provide the mobile terminal access to the IMS mobile communication network based on the IMS subscription.

2. The server of claim 1, wherein the home network of the mobile terminal is a circuit-switched network.

3. The server of claim 1, wherein the network information element is an identity string.

4. The server of claim 1, wherein the server is one of a Home Subscription Server or an Application Server.

5. The server of claim 1, wherein the subscription generation procedure comprises a procedure for generating one or more identity strings for the IMS subscription.

6. The server of claim 5, wherein the computer-readable instructions, when executed by the microprocessor, are further configured to:

generate one or more identity strings for the IMS subscription using at least parts of the home subscription data.

7. The server of claim 1, wherein the computer-readable instructions, when executed by the microprocessor, are further configured to:

communicate with the home network on a basis of information in the home network identifying element, to obtain home subscription data related to a home network subscription of the mobile terminal.

8. The server of claim 7, wherein the home subscription data comprises authentication information, and the subscription generation procedure comprises a routine for authenticating the mobile terminal on the basis of the authentication information.

9. The server of claim 1, wherein the home subscription data further comprises home network settings information, and the computer-readable instructions, when executed by the microprocessor, are further configured to generate for the IMS subscription visited network service settings in accordance with service settings information format of the visited IMS mobile communication network, using service settings information of the home network.

10. The server of claim 1, wherein the computer-readable instructions, when executed by the microprocessor, are further configured to send an addressing indicator to the home network for routing incoming calls to the mobile terminal.

11. The server of claim 1, wherein responsive to receiving a specific type of network information element that comprises a proper domain name of the visited network and the specific type of network information element can be processed according to an established procedures of an IP based network, despite that the specific type of network information element is not registered.

12. The server of claim 1, further comprising executing the subscription generating procedure for generating a subscription for the user upon recognizing that the network information element comprises the home network identifying element that identifies a home network of the user and a domain name of an IP based mobile communication network as a base domain identifier.

13. A method in an Internet Protocol (IP) Multimedia Subsystem (IMS) mobile communication network, comprising:

receiving from a mobile terminal, a network information element, wherein the network information element comprises a home network identifying element that identifies a home network of the mobile terminal, and the mobile terminal does not have any dedicated IMS mobile communication identities and no IMS subscriptions in the home network;

receiving home subscription data related to a home network subscription of the mobile terminal;

in response to receiving the network information element, executing an IMS subscription generating procedure for generating an IMS subscription using the home subscription data, wherein the IMS subscription comprises a user profile upon recognizing the network information element; and providing the mobile terminal access to the IMS mobile communication network based on the IMS subscription.

14. The method of claim 13, wherein the home network of the mobile terminal is a circuit-switched network.

15. The method of claim 13, further comprising:

communicating with the home network on a basis of information in the home network identifying element, to obtain home subscription data related to a home network subscription of the mobile terminal.

16. The method of claim 13, further comprising:

generating for the IMS subscription visited network service settings in accordance with service settings information format of the visited IMS mobile communication network, using service settings information of the home network.

17. A method in a mobile terminal, comprising:

generating a network information element, wherein the network information element comprises a home network identifying element that identifies the home network of the mobile terminal, and the mobile terminal does not have any dedicated Internet Protocol (IP) Multimedia Subsystem (IMS) communication identities and no IMS subscriptions in the home network; and sending the network information element to an IMS mobile communication network, wherein the mobile terminal accesses the IMS mobile communication network via an IMS subscription generated, responsive to the IMS mobile communication network receiving the network information element, using home subscription data retrieved by the IMS mobile communication network from the home network.

18. The method of claim 17, wherein the home network of the mobile terminal is a circuit-switched network.

19. A mobile terminal, comprising:

a transceiver;

a controller further comprising:

a microprocessor, and a computer-readable storage medium, coupled to the microprocessor, and including computer-readable instructions, when executed by the microprocessor, are configured to:

generate a network information element, wherein the network information element comprises a home network identifying element that identifies the home network of the mobile terminal, and the mobile terminal does not have any dedicated Internet Protocol (IP) Multimedia Subsystem (IMS) communication identities and no IMS subscriptions in the home network; and send, via the transceiver, the network information element to an IMS mobile communication network, wherein the mobile terminal accesses the IMS mobile communication network via an IMS subscription generated, responsive to the IMS mobile communication network receiving the network information element, using home subscription data retrieved by the IMS mobile communication network from the home network.

20. The mobile terminal of claim 19, wherein the home network of the mobile terminal is a circuit-switched network.

* * * * *